(12) United States Patent
Uno et al.

(10) Patent No.: US 11,544,960 B2
(45) Date of Patent: Jan. 3, 2023

(54) ATTRIBUTE RECOGNITION SYSTEM, LEARNING SERVER AND NON-TRANSITORY COMPUTER-READABLE RECORDING MEDIUM

(71) Applicant: AWL, Inc., Chiyoda-ku (JP)

(72) Inventors: Reo Uno, Chiyoda-ku (JP); Yasuhiro Tsuchida, Chiyoda-ku (JP)

(73) Assignee: AWL, Inc., Chiyoda-ku (JP)

( * ) Notice: Subject to any disclaimer, the term of this patent is extended or adjusted under 35 U.S.C. 154(b) by 158 days.

(21) Appl. No.: 16/919,311

(22) Filed: Jul. 2, 2020

(65) Prior Publication Data

US 2021/0004568 A1 Jan. 7, 2021

(30) Foreign Application Priority Data

Jul. 3, 2019 (JP) .............................. JP2019-124301

(51) Int. Cl.
*G06V 40/16* (2022.01)
*G06V 30/194* (2022.01)

(52) U.S. Cl.
CPC .......... *G06V 40/161* (2022.01); *G06V 30/194* (2022.01); *G06V 40/172* (2022.01); *G06V 40/178* (2022.01)

(58) Field of Classification Search
CPC .. G06V 40/161; G06V 30/194; G06V 40/172; G06V 40/178
USPC ........................................................ 382/118
See application file for complete search history.

(56) References Cited

U.S. PATENT DOCUMENTS

2018/0373980 A1* 12/2018 Huval ................... G06K 9/6254
2019/0244014 A1* 8/2019 Ranjan ................. G06V 40/161

FOREIGN PATENT DOCUMENTS

| JP | 2008-310392 A | 12/2008 |
| JP | 4778532 B2 | 9/2011 |
| JP | 2019-021001 A | 2/2019 |

OTHER PUBLICATIONS

Bucila "Model Compression", KDD 2006 (Year: 2006).*
Japanese Office Action dated Nov. 1, 2019 in Japanese Patent Application 2019-124301 (with English Machine Translation), 6 pages.

* cited by examiner

*Primary Examiner* — Mark Roz
(74) *Attorney, Agent, or Firm* — Oblon, McClelland, Maier & Neustadt, L.L.P.

(57) ABSTRACT

An attribute recognition system has a person face detection circuitry to detect a suitable person or face for recognition of at least one attribute from persons or faces captured in frame images input from at least one camera to capture a given capture area, an identification information assignment circuitry to identify the persons or faces captured in the frame images having been subjected to the detection by the person face detection circuitry so as to assign an identification information to each identified person or face, and an attribute recognition circuitry to recognize the attribute of a person or face assigned with the identification information, only if the person or face is yet without being subjected to recognition of the attribute, and at the same time if the person or face has been detected by the person face detection circuitry as a suitable person or face for the recognition of the attribute.

15 Claims, 9 Drawing Sheets

ATTRIBUTE RECOGNITION SYSTEM, LEARNING SERVER AND NON-TRANSITORY COMPUTER-READABLE RECORDING MEDIUM

CROSS-REFERENCE TO RELATED APPLICATION

This application is based on and claims the benefit of priority of the prior Japanese Patent Application No. 2019-124301, filed on Jul. 3, 2019, the entire contents of which are incorporated herein by reference.

BACKGROUND OF THE INVENTION

1. Field of the Invention

The present invention relates to an attribute recognition system, a learning server and a non-transitory computer-readable recording medium.

2. Description of the Related Art

Conventionally, there is an attribute recognition system which detects a face of a person captured in a frame image taken by a camera such as a surveillance camera or a so-called AI (Artificial Intelligence) camera, and uses the detected face (image) to recognize (classify) attributes such as gender and age. Generally, in this kind of system, it is difficult to accurately recognize an attribute such as gender and age from only a face (image) of a person captured in one frame image. Thus, there is a system configured to recognize an attribute such as gender and age from faces (images) of a person captured in a plurality of successively acquired frame images (for example, refer to Japanese Patent 4778532). In this system, all the plurality of successively acquired frame images are subjected to detection of faces of a person captured in these frame images, and all the detected faces are subjected to a process of recognizing an attribute such as gender and age. This system either (1) uses only results of recognition (results of determination) with a high probability that the person has a given attribute so as to comprehensively determine the attribute, or (2) uses an average of all the results of recognition on the attribute (average of the probabilities that the person has the given attribute) so as to determine the attribute.

The method (1) described above is such that assuming, for example, the attribute to be recognized is gender, and the threshold of determination probability is 80%, then, for example, a result of recognition with a 93% probability of the person being a male and a result of recognition with an 81% probability of the person being a male are used to (comprehensively) determine that the (certain) person captured in the plurality of successively acquired frame images is a male. Further, the method (2) described above is a determination method as follows. More specifically, for example, assume that the number of the plurality of successively acquired frame images is 6, and that the probabilities that a (certain) person captured in these frame images is a male are 93%, 67%, 45%, 74%, 81% and 74%, respectively, and further that the probabilities that the person is a female are 7%, 33%, 55%, 26%, 19% and 26%, respectively. In this case, the method (2) calculates an average of these probabilities, and more specifically calculates the probability of the person being a male as 72% (=(93+67+45+74+81+74)/6) and the probability of the person being a female as 28% (=(7+33+55+26+19+26)/6), thereby determining that the (certain) person captured in the plurality of frame images is a male.

However, according to the conventional system disclosed in Japanese Patent 4778532 described above, regardless of using either the method (1) or the method (2), all the plurality of successively acquired frame images are subjected to detection of faces of a person captured in these frame images, and all the detected faces are subjected to a process of recognizing an attribute such as gender and age. In other words, all the (images of faces in the) plurality of successively acquired frame images are subjected to the process of recognizing the attribute such as gender and age. Thus, there is a problem that the load of the process of recognizing (classifying) the attribute such as gender and age is high.

BRIEF SUMMARY OF THE INVENTION

An object of the present invention is to solve the problems described above, and to provide an attribute recognition system, a learning server and a non-transitory computer-readable recording medium for recording an attribute recognition program that make it possible to accurately recognize an attribute such as gender and age from only a person or face captured in one frame image, making it possible to reduce the load of the process of recognizing the attribute.

According to a first aspect of the present invention, this object is achieved by an attribute recognition system comprising: a person face detection circuitry configured to detect a suitable person or face for recognition of at least one attribute from persons or faces captured in frame images input from at least one camera to capture a given capture area; an identification information assignment circuitry configured to identify the persons or faces captured in the frame images having been subjected to the detection by the person face detection circuitry so as to assign an identification information to each identified person or face; and an attribute recognition circuitry configured to recognize the at least one attribute of a person or face assigned with the identification information, only if the person or face is yet without being subjected to recognition of the at least one attribute, and at the same time if the person or face has been detected by the person face detection circuitry as a suitable person or face for the recognition of the at least one attribute.

This attribute recognition system is configured to recognize the attribute of the person or face assigned with the identification information only if this person or face is yet without being subjected to recognition of the attribute, and at the same time if this person or face has been detected by the person face detection circuitry as a suitable person or face for the recognition of the attribute, the attribute recognition circuitry recognizes the attribute of this person or face. Thus, it is possible to accurately recognize an attribute such as gender and age from only a person or face captured in one frame image. This makes it possible to reduce the load of the process of recognizing the attribute in contrast to the conventional system described in Japanese Patent 4778532 described above.

According to a second aspect of the present invention, the above object is achieved by a learning server comprising: a relearning dataset editing circuitry configured to edit correct labels of a relearning dataset of a learned neural network for object detection, based on result of verification of result of detection using the learned neural network for object detection to detect a suitable person or face for recognition of at least one attribute from persons or faces captured in frame images input from at least one camera to capture a given capture area; and a relearning circuitry configured to allow the learned neural network for object detection to relearn using the relearning dataset having been edited by the relearning dataset editing circuitry.

This learning server is configured so that based on the result of verification of the result of detection using the learned neural network for object detection to detect the suitable person or face for the recognition of the attribute from persons or faces captured in frame images, the learning server edits correct labels of a relearning dataset of the learned neural network for object detection, and the learning server allows the learned neural network for object detection to relearn using the relearning dataset having been edited. This relearning makes it possible to allow the learned neural network for object detection to highly accurately detect a person or face suitable for the recognition of the attribute from persons or faces captured in the frame images. Therefore, it is possible to accurately detect the attribute such as gender and age from only a person or face in one frame image which has been detected as suitable for the recognition of the attribute using the learned neural network for object detection after the relearning.

According to a third aspect of the present invention, the above object is achieved by a non-transitory computer-readable recording medium for recording an attribute recognition program to cause a computer to execute a process including the steps of: detecting a suitable person or face for recognition of at least one attribute from persons or faces captured in frame images input from at least one camera to capture a given capture area; identifying the persons or faces captured in the frame images having been subjected to the detection so as to assign an identification information to each identified person or face; and recognizing the at least one attribute of a person or face assigned with the identification information only if this person or face is yet without being subjected to recognition of the at least one attribute, and at the same time if this person or face has been detected as a suitable face for the recognition of the at least attribute.

According to this non-transitory computer-readable recording medium, it is possible to obtain an effect similar to that by the attribute recognition system according to the first aspect of the present invention.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein.

DETAILED DESCRIPTION OF THE INVENTION

Figure 1:
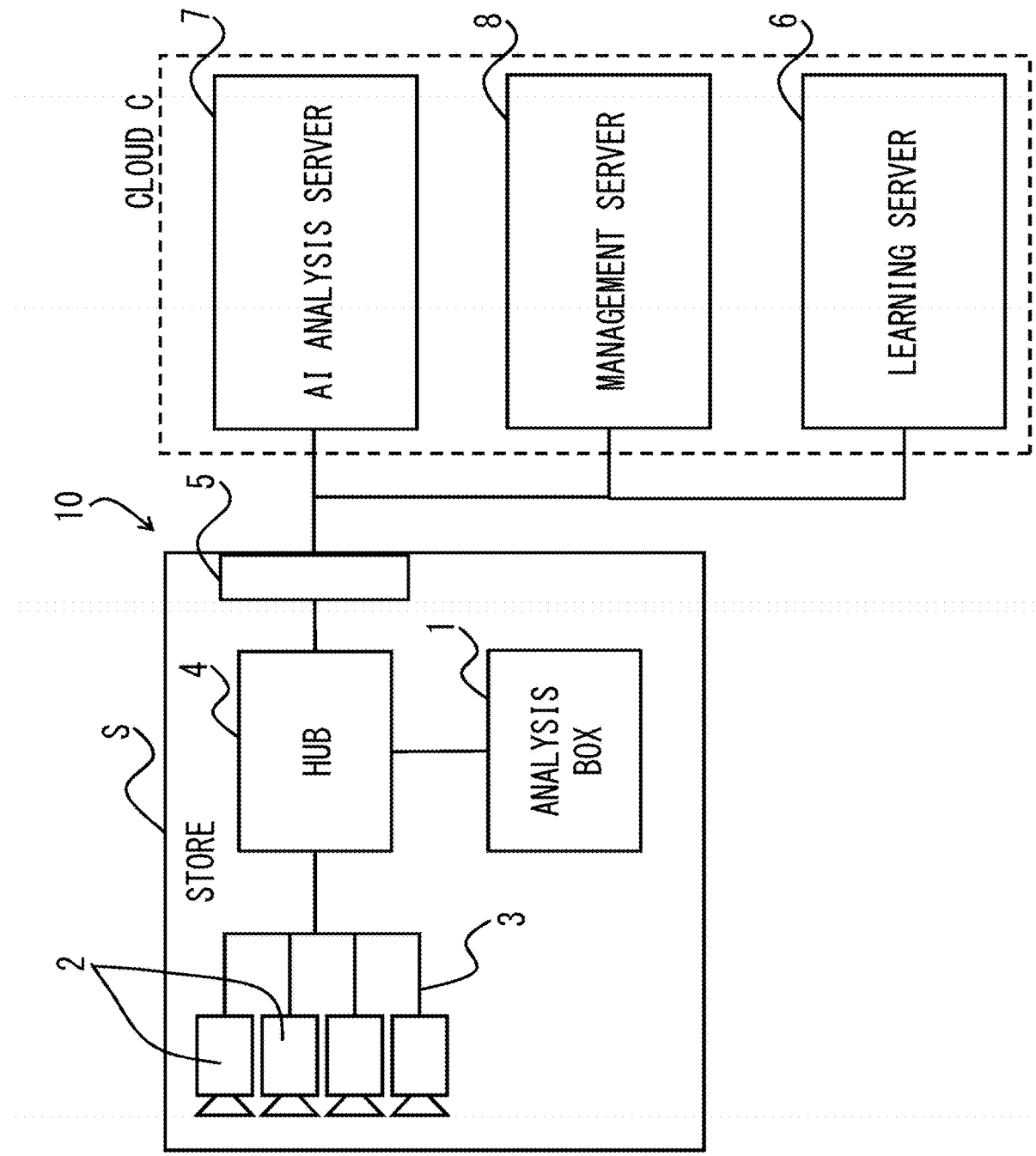
FIG. 1 is a schematic block diagram showing an outline of an attribute recognition system according to an exemplary embodiment of the present invention.

Hereinafter, an attribute recognition system, a learning server, and a non-transitory computer-readable recording medium for recording an attribute recognition program according to an exemplary embodiment of the present invention will be described with reference to the drawings. FIG. 1 is a schematic block diagram showing an outline of an attribute recognition system 10 according to the exemplary embodiment of the present invention. The present embodiment describes an example in which an analysis box 1 (corresponding to the "computer" in the claims) and a plurality of network cameras 2 (Internet Protocol or IP cameras) connected to the analysis box 1 are placed in a store S such as a chain store. As shown in FIG. 1, the attribute recognition system 10 comprises a hub 4 and a router 5 in the store S in addition to the analysis box 1 and the cameras 2. The analysis box 1 is connected to each of the plurality of cameras 2 via a LAN (Local Area Network) 3 and the hub 4 to analyze input images from each of these cameras 2. More specifically, the analysis box 1 subjects input images from each of the cameras 2 to an object detection process (face detection process), and also subjects images of objects detected by the object detection process to an object recognition process (including a process of recognizing at least one attribute including gender and age).

Further, the attribute recognition system 10 comprises an AI (Artificial Intelligence) analysis server 7, a management server 8 and a learning server 6 on cloud C. Based on a result of object recognition from the analysis box 1, the AI analysis server 7 analyzes, for example, the behaviors of persons in each store S, and converts, for output, information on the result of analysis to data which can be easily used for applications for various uses such as marketing, crime prevention and so on. The management server 8 manages a plurality of such analysis boxes 1 placed in such stores S as well as such cameras 2 connected to these analysis boxes 1. More specifically, the management server 8 installs an application package in each of the analysis boxes 1 in the respective stores S, and controls the start, stop and the like of the cameras 2 connected to these analysis boxes 1.

Note that this application package is a package program including a learned neural network model for object detection (hereafter referred to as "object detection NN model"), at least one kind of learned neural network model for object recognition (hereafter referred to as "object recognition NN model"), and a control script describing how to use (describing a process order of) these neural network models (hereafter referred to as "NN models"). More specifically, the application package is a package program including: a face detection model (refer to FIG. 6) which is a learned object detection NN model; a gender/age estimation model (refer to FIG. 6) and a vectorization model each of which is a learned object recognition NN model; and a control script describing a process order of these NN models.

As will be described in detail later, the learning server 6 has a function to edit correct labels of a relearning dataset (dataset for relearning) of a face detection model included in the application package installed in the analysis box 1 described above, and a function to allow the face detection model to relearn using the edited relearning dataset. Note that the relearning described above is a process to allow a learned face detection model to learn again (start over) using the relearning dataset so as to keep high the accuracy of the face detection model (installed in the analysis box 1). After the relearning is done, the relearned face detection model as a new version is installed in the analysis box 1 from the learning server 6 via the management server 8.

Figure 2:
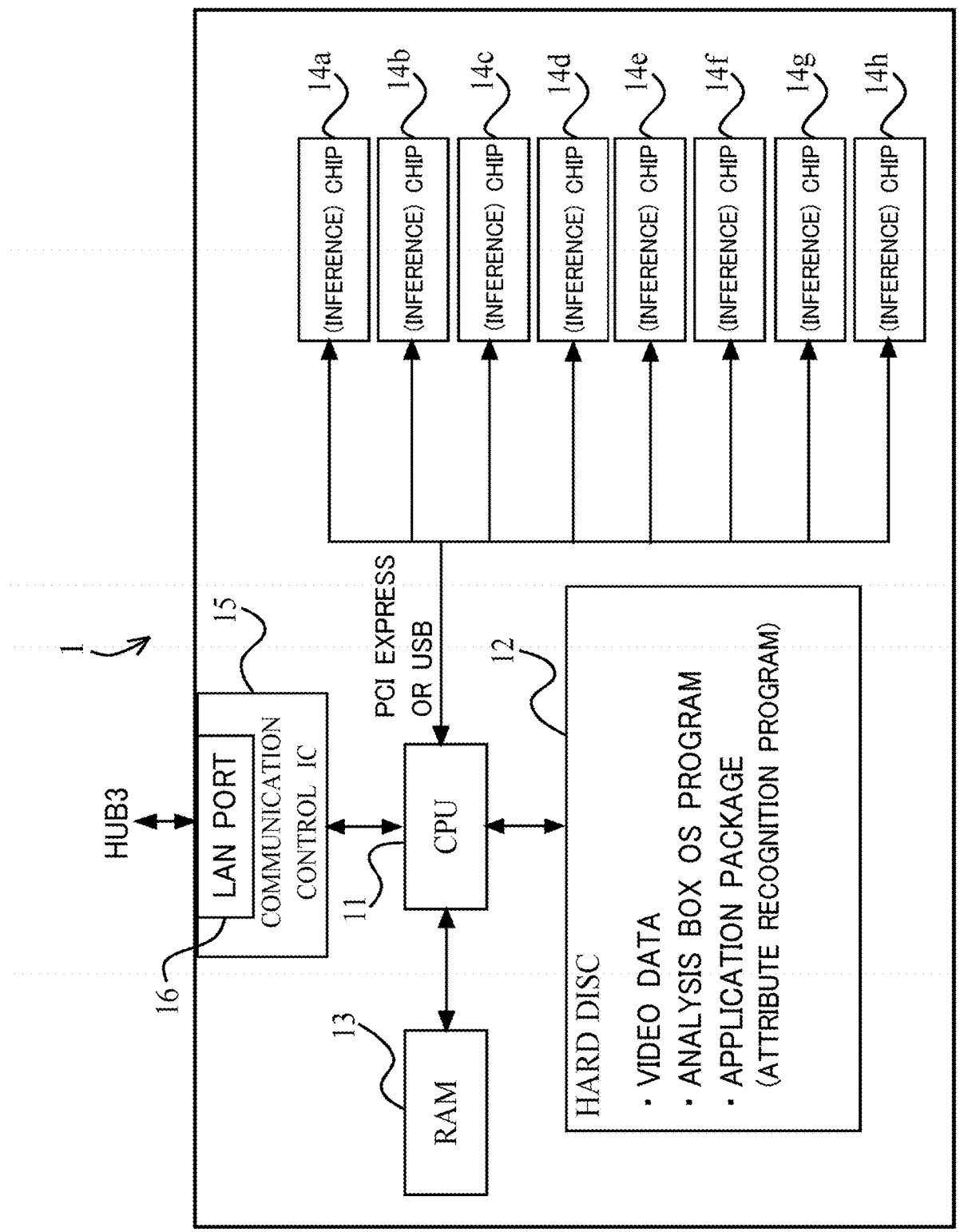
FIG. 2 is a schematic block diagram showing a hardware configuration of an outline of an analysis box in FIG. 1.

Next, referring to FIG. 2, the hardware configuration of the analysis box 1 will be described. The analysis box 1 comprises: a CPU (Central Processing Unit) 11 configured to control the entire device and perform various operations; a hard disk 12 (corresponding to the "non-transitory computer-readable recording medium" in the claims) for recording or storing various data and programs; a RAM (Random Access Memory) 13; inference chips (hereafter referred to simply as "chips") 14a to 14h as DNN (Deep Neural Networks) inference processors; and a communication control IC (Integrated Circuit) 15. The CPU 11 is a common general-purpose CPU or a CPU designed to increase parallel processing performance to process a lot of video streams at the same time. Further, the data recorded or stored in the hard disk 12 include video data (data of frame images) obtained by decoding (data of) video streams input from each of the cameras 2, while the programs recorded or stored in the hard disk 12 include not only the above-described application package (corresponding to the "attribute recognition program" in the claims and in FIG. 5), but also programs of an analysis box OS (Operating System) 54 which will be described in the description of FIG. 5.

The (inference) chips 14a to 14h are preferably processors optimized for DNN inference (chips dedicated for the inference), but can be general-purpose GPUs (Graphics Processing Units) used for common use, or other processors. Further, the chips 14a to 14h can be devices made by integrating (mounting) a plurality of chips (inference processors) on one board computer. As shown in FIG. 2, the (inference) chips 14a to 14h are connected to the CPU 11 by PCI (Peripheral Component Interconnect) Express or USB (Universal Serial Bus). Further, the communication control IC 15 has a LAN port 16 which is a port for connection to LAN based on the Ethernet Standard.

Figure 3:
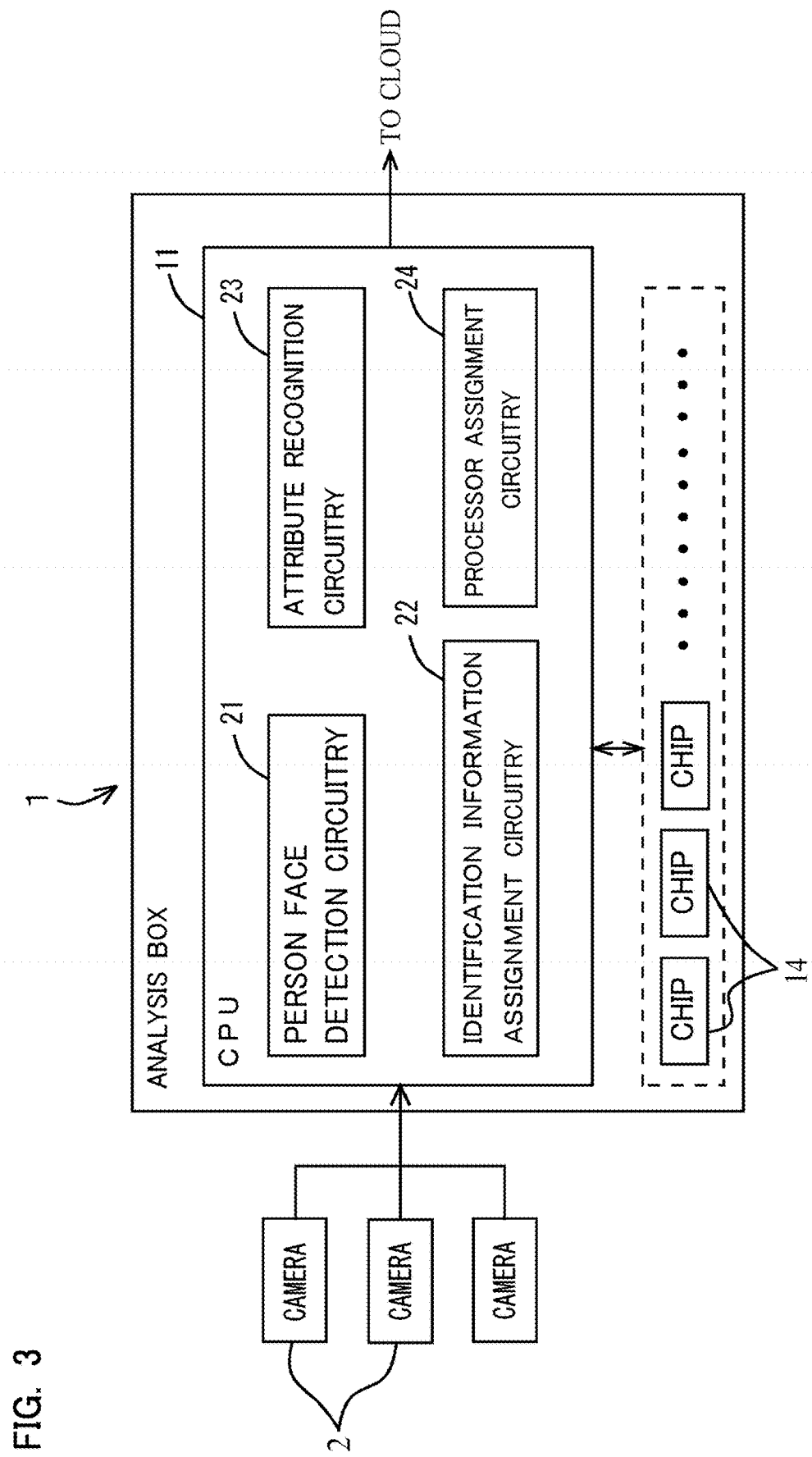
FIG. 3 is a schematic block diagram showing a functional block diagram of a CPU in the analysis box.

FIG. 3 shows functional blocks of the CPU 11 in the analysis box 1 in FIG. 1. As the functional blocks, the analysis box 1 comprises a person face detection circuitry 21, an identification information assignment circuitry 22, an attribute recognition circuitry 23 and a processor assignment circuitry 24. The person face detection circuitry 21 detects a suitable face for estimation of gender/age (corresponding to the "attribute recognition" in the claims) from faces (of persons) captured in frame images input from the plurality of cameras 2 which capture a given capture area. The identification information assignment circuitry 22 identifies the faces captured in the frame images having been subjected to the face detection by the person face detection circuitry 21, and assigns an ID (identification information) to each (person of) identified face.

Only if the (person of the) face assigned with the ID (identification information) by the identification information assignment circuitry 22 is yet without being subjected to (in other words, has not yet been subjected to) estimation of gender and age ("recognition of attribute"), and at the same time if the face assigned with the ID has been detected by the person face detection circuitry 21 as a suitable face for the estimation of gender/age, the attribute recognition circuitry 23 estimates the gender and age of the (person) of this face. Further, based on an inference time and a frequency of use required for an inference process in each of the object detection NN model (face detection model) and the object recognition NN models (gender/age estimation model and vectorization model) included in each instance of the application package, the processor assignment circuitry 24 assigns, from the plurality of chips 14a to 14h, chips (inference processors) to be used for the inference process in the object detection NN model and the inference process in each of the at least one kind of object recognition NN model.

Figure 4:
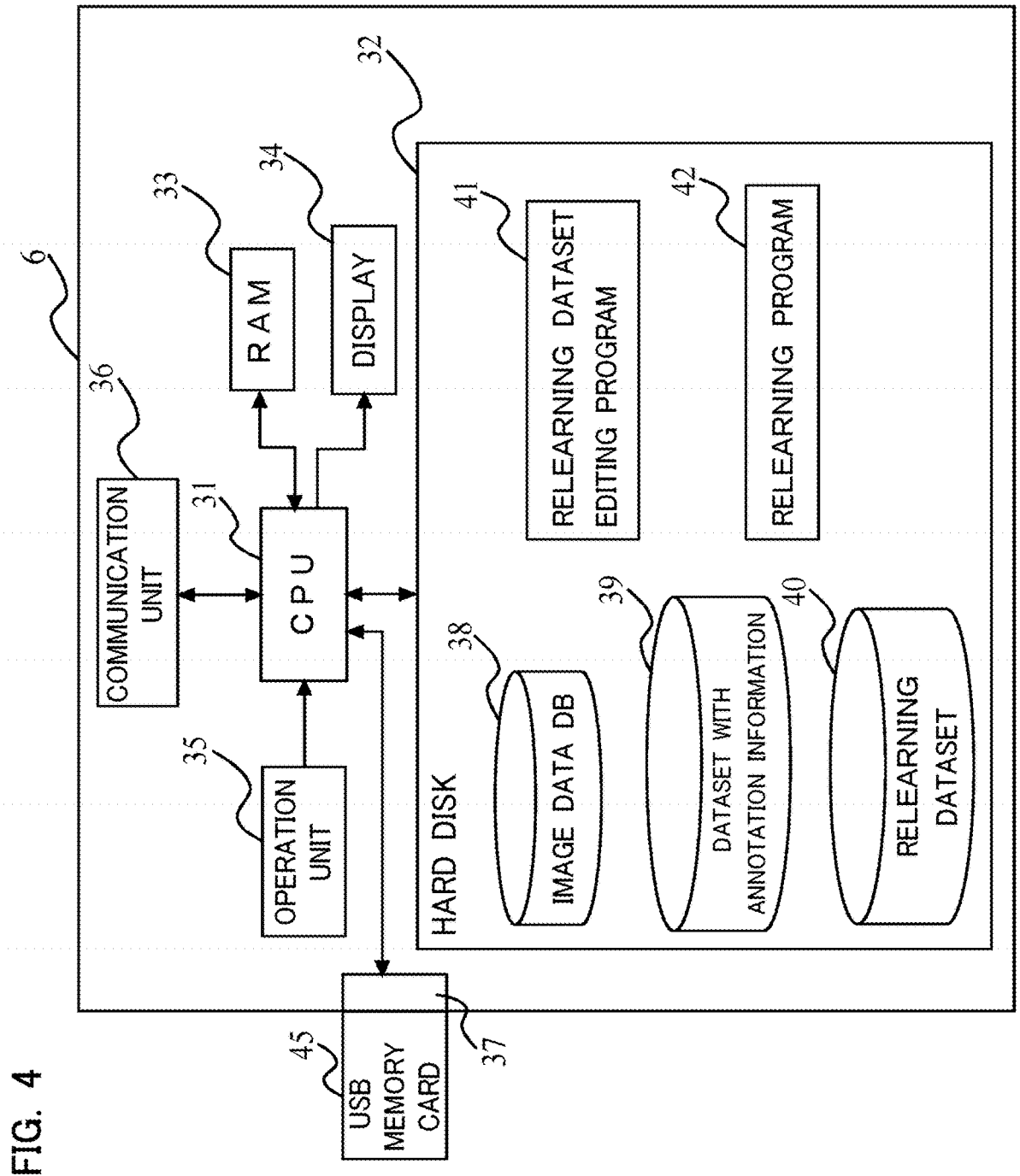
FIG. 4 is a schematic block diagram showing a hardware configuration of an outline of a learning server in FIG. 1.

Next, referring to FIG. 4, the hardware configuration of the learning server 6 will be described. The learning server 6 comprises: a CPU 31 (corresponding to the "relearning dataset edition circuitry", "detection result verification circuitry" and "relearning circuitry" in the claims) configured to control the entire device and perform various operations; a hard disk 32 to store various data and programs; a RAM (Random Access Memory) 33; a display 34, an operation unit 35, a communication unit 36 and a USB (Universal Serial Bus) connector 37 which is a port for connection to USB devices. A USB memory card 45 recording or storing image data and so on can be connected to the USB connector 37. The programs recorded or stored in the hard disk 32 include: a relearning dataset editing program 41 to edit the correct labels of the relearning dataset of the face detection model (included in the application package installed in the analysis box 1), and a relearning program 42 to allow the face detection model to relearn using the relearning dataset having been edited by the relearning dataset editing program 41. Further, the data recorded or stored in the hard disk 32 include an image data DB (Data Base) 38, a dataset with annotation information 39 and a relearning dataset (dataset for relearning) 40.

The image data DB 38 is a database storing a lot of frame images capturing persons and being used for the dataset with annotation information 39 and for the relearning dataset 40. The frame images in the image data DB 38 can be input from another computer such as the analysis box 1 via the communication unit 36, and can also be input from the USB memory card 45. Further, the dataset with annotation information 39 is a dataset created by providing each frame image input from the image data DB 38 with information of a face bounding box (hereafter referred to as "face box") and with a gender/age label of each face box. Here, the information of a face bounding box described above means information on the position, width and height of a face detected in each frame image. Further, the relearning dataset 40 is a relearning dataset of a (learned) face detection model created by providing each frame image contained in the dataset with annotation information 39 with the face box and a Positive/Negative label.

Figure 5:
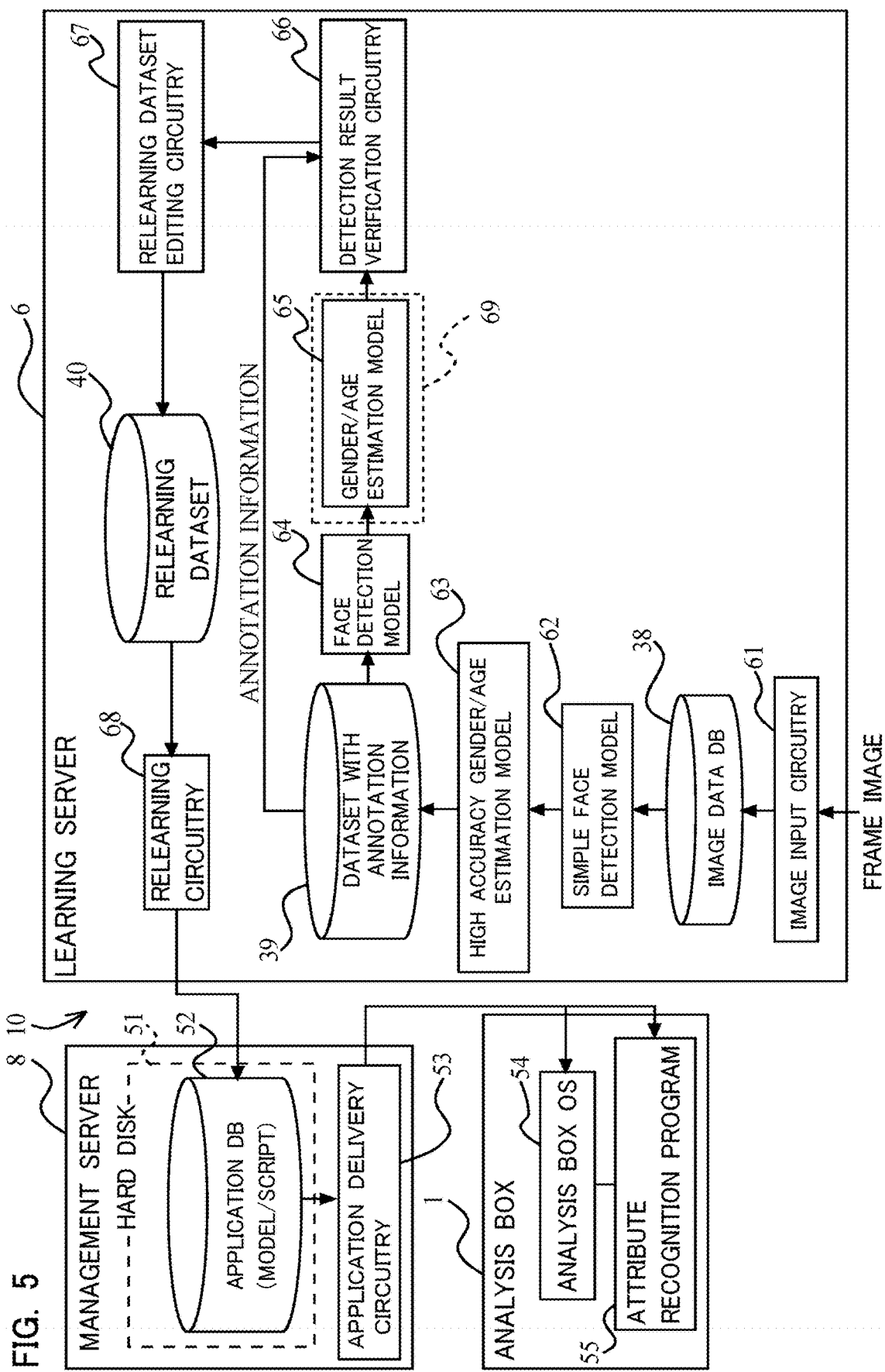
FIG. 5 is a schematic block diagram showing an outline of functions performed by main units and a flow of main data in the attribute recognition system.

Next, referring to FIG. 5, an outline of functions performed by the main units (the analysis box 1, the learning server 6 and the management server 8) and a flow of main data in the attribute recognition system 10 shown in FIG. 1 will be described. FIG. 5 shows functional blocks, NN models and main data files in the main units of FIG. 1. In FIG. 5, a learning attribute recognition circuitry (attribute recognition circuitry for learning) designated by reference numeral 69, a detection result verification circuitry 66, a relearning dataset editing circuitry 67 and a relearning circuitry 68 are functional blocks of the CPU 31 of the learning server 6. As shown in FIG. 5, the management server 8 comprises a hard disk 51 recording or storing an application DB 52 which stores an application package. The application package stored in the application DB 52 comprises: a learned face detection model; a learned gender/age estimation model and a learned vectorization model; and a control script describing a process order of these NN models. This application package is delivered to the analysis box 1 by an application delivery circuitry 53.

The analysis box 1 installs the application package received from the management server 8 therein as an attribute recognition program 55 shown in FIG. 5. The analysis box 1 also receives an analysis box OS 54 from the management server 8. This analysis box OS 54 is configured to control applications such as instances of the attribute recognition program 55 in the analysis box 1, and to send and receive data to and from the management server 8. Note that the attribute recognition program 55 is an application package to perform processes corresponding to the person face detection circuitry 21, the identification information assignment circuitry 22 and the attribute recognition circuitry 23 in FIG. 3. The learning server 6 comprises an image input circuitry 61 configured to input frame images to the image data DB 38. These frame images can be input from another computer such as the analysis box 1 via the communication unit 36, and can also be input from the USB memory card 45. In other words, the image input circuitry 61 can be the communication unit 36, or can be the USB connector (USB port) 37 in FIG. 4.

After the process of inputting the frame images to the image data DB 38 is completed, the CPU 31 of the learning server 6 subjects each frame image stored in the image data DB 38 to face detection using a learned, simple face detection model 62 so as to provide each frame image with face box information. Here, the simple face detection model 62 is an NN model for a simple face detection process to only detect a face captured in frame images to be detected and provide the detected face with a face box (information of a face bounding box). Note, however, that it is desirable that at the time of normal operation of the analysis box 1, the simple face detection model 62 can perform a more accurate inference (in terms of a simple face detection process) than the face detection model 64, which is used for the face detection process in the analysis box 1.

Further, the CPU 31 of the learning server 6 subjects the face detected by the simple face detection model 62 to estimation of gender/age using a high accuracy gender/age estimation model 63 which is a learned object recognition NN model capable of performing a more accurate inference than a gender/age estimation model 65 (refer to FIG. 6) used to estimate the gender/age in the analysis box 1 at the time of normal operation of the analysis box 1. Thereafter, the CPU 31 provides the frame image having the face box with a gender/age label (annotation information), which indicates a result of this estimation, thereby creating a dataset with annotation information 39. Note that the above description has shown an example in which the gender/age label (annotation information) is obtained by subjecting the face detected using the simple face detection model 62 to estimation of gender/age using the learned high accuracy gender/age estimation model 63 capable of performing a highly accurate inference. However, it is also possible for a person such as a system manager to use an operation unit 35 of the learning server 6 to input the gender/age label (annotation information).

After the creation of the dataset with annotation information 39 is ended, the CPU 31 of the learning server 6 subjects each frame image stored in the dataset with annotation information 39 to a face detection process and a gender/age estimation process using the face detection model 64 and the gender/age estimation model 65 which are used in the analysis box 1 at the time of its normal operation. Then, the detection result verification circuitry 66 of the CPU 31 of the learning server 6 compares the result of estimation of gender/age using the face detection model 64 and the gender/age estimation model 65 used at the time of normal operation of the analysis box 1 with content of the gender/age label (annotation information) contained in the dataset with annotation information 39 so as to verify the result of estimation of gender/age using the gender/age estimation model 65, thereby verifying whether the result of detection using the face detection model 64 (result of classification of Positive and Negative using the face detection model 64) is correct or not. Note that the learning attribute recognition circuitry 69 in FIG. 5 is a functional block of the CPU 31 (of the learning server 6) which is configured to use the gender/age estimation model 65 for recognizing the attribute of the (person of the) face captured in the frame image so as to recognize the attribute of the (person of the) face.

Based on the result of verification by the detection result verification circuitry 66, the relearning dataset editing circuitry 67 of the CPU 31 of the learning server 6 edits the correct labels (Positive or Negative) of the relearning dataset 40 of the face detection model 64. Then, the relearning circuitry 68 of the CPU 31 of the learning server 6 allows the face detection model 64 to relearn using the relearning dataset 40 having been edited by the relearning dataset editing circuitry 67. The relearned face detection model 64 (which corresponds to the "face detection model 70 capable to detect a suitable face for the estimation of gender/age as Positive" in FIG. 6 and FIG. 8) is once sent from the learning server 6 to the management server 8 and stored in the application DB 52 of the management server 8, and is thereafter installed at an appropriate timing from the management server 8 to the analysis box 1 in each store.

Note that the face detection model 64 used by the learning server 6 in FIG. 5 is not necessarily a face detection model similar to the face detection model used in the analysis box 1 at the time of its normal operation (that is, a face detection model which outputs a detected face as Positive if it is suitable for the estimation of gender/age, and outputs it as Negative if it is not suitable for the estimation of gender/age). Like the simple face detection model 62 described above, the face detection model 64 can be a simple face detection model to only detect a face captured in frame images to be detected and provide the detected face with a face box, or can be a NN model for a person face detection process to detect both person and face and provide each of the detected person and face with a box (bounding box information).

Next, referring to the flow chart of FIG. 6, the flow of the face detection process and the gender/age estimation process at the time of normal operation of the analysis box 1 will be described. The person face detection circuitry 21 of the CPU 11 of the analysis box 1 detects a suitable face for the estimation of gender/age from faces captured in frame images input from a plurality of cameras 2 which capture a given capture area (S1). More accurately, the person face detection circuitry 21 detects the faces captured in the frame images, and outputs, to each detected face, a face box (bounding box information of a face) and a result of classification which is Positive if the detected face is suitable for the estimation of gender/age, or is Negative if the detected face is not suitable for the estimation of gender/age.

When the face detection process in S1 ends, the identification information assignment circuitry 22 of the CPU 11 of the analysis box 1 identifies the faces captured in the frame images having been subjected to the face detection by the person face detection circuitry 21, and assigns a person ID to each identified (person of) face (S2). Specifically, the identification information assignment circuitry 22 uses object tracking technology or the like based on current and past results of detection by the person face detection circuitry 21 so as to assign the same person ID to each person of the detected face.

If object tracking technology is used for the assignment of the person ID, the identification assignment circuitry 22 of the CPU 11 of the analysis box 1 can use an implementation of a so-called object tracking process such that: (1) based on the detection position/size and detection time of faces assigned with the same person ID in a group of frame images for a given past period, the detection position/size of a face with such person ID in the current frame image is estimated using a Kalman filter or the like; (2) the size of an overlapping area between the detection position/size of such estimated face and the detection position/size of the face detected in the current frame image is calculated; (3-1) a face whose such overlapping area has a given size or larger and which is the largest is selected, and the person ID of such selected face is taken over; and (3-2) if there is no face whose such overlapping area has a given size or larger, a new person ID is assigned.

It is also possible that the identification information assignment circuitry 22 of the CPU 11 of the analysis box 1 uses a vectorization model contained in the above-described application package (attribute recognition program 55 of FIG. 5) to identify whether the face is of the same person or not, and assigns a person ID based on the result of this identification. More specifically, the identification information assignment circuitry 22 of the CPU 11 of the analysis box 1 uses the vectorization model to vectorize images of faces captured in different frame images, and calculates based on these vectors a distance corresponding to the degree of dissimilarity between these images, so as to identify based on this distance whether the faces captured in these images are of the same person or not. In this example, a Dist function is used for the calculation of distance.

Figure 7:
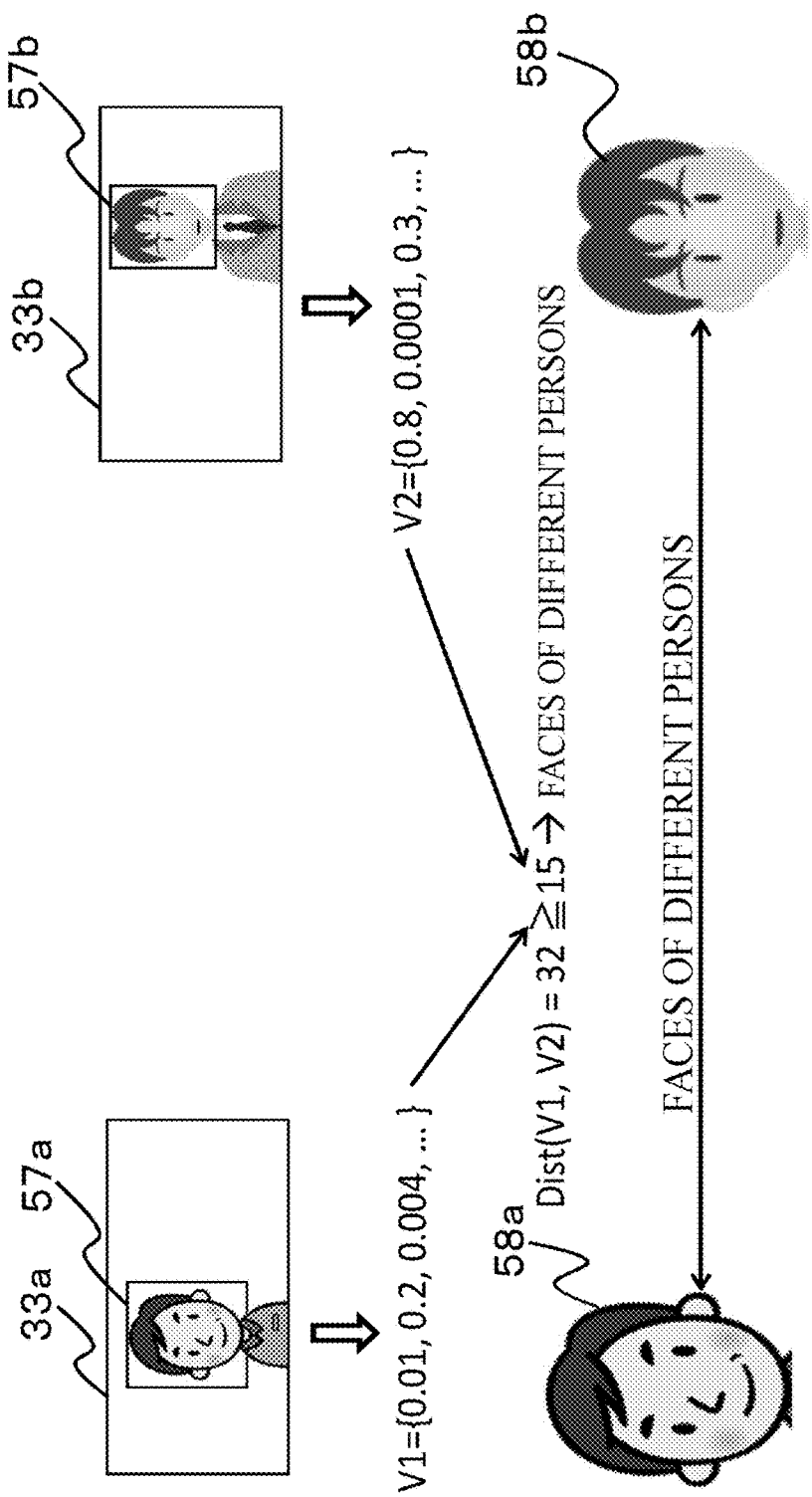
FIG. 7 is an explanatory view of a vectorization process performed by a vectorization model included in an application package of the analysis box.

More specifically, as shown in FIG. 7, the identification information assignment circuitry 22 of the CPU 11 of the analysis box 1 inputs images of faces (hereafter referred to as "face images") 57a, 57b in different frame images 33a, 33b, which have been subjected to the face detection using the face detection model 70, to (a DNN model of) the vectorization model, whereby as indicated in FIG. 7, the vectorization model converts the face images 57a, 57b to vectors V1, V2 for output. These vectors V1, V2 are, for example, 128-dimensional vectors. When both the vector V1 obtained from the face image 57a and the vector V2 obtained from the face image 57b are input to a Dist function, the output value of the Dist function is lower than a predetermined value (for example, 15) if the face 58a captured in the face image 57a is the same as the face 58b captured in the face image 57b. In contrast, in the case of the example shown in FIG. 7, the output value (32) of the Dist function is equal to or higher than the predetermined value (15), and therefore, this means that the face 58a captured in the face image 57a is of a different person from the face 58b captured in the face image 57b. Here, the Dist function is a function to calculate a distance between input vectors.

As described above, the identification information assignment circuitry 22 of the CPU 11 of the analysis box 1 identifies whether the face captured in each frame image is of the same person or not, and as a result of this identification, assigns the same person ID to a face of the same person and a different person ID to a face of a different person. Note that it is also possible that the identification information assignment circuitry 22 is configured to perform a combination of the person ID assignment using the object tracking process described above and the person ID assignment using the distance between vectors described above. More specifically, in the case of the person ID assignment using the object tracking process, an error in the ID assignment is likely to occur when a plurality of persons intersect. Therefore, after a plurality of persons intersect, the identification information assignment circuitry 22 uses the distance calculation between vectors to compare the vector of each person after the intersection of persons with the vector of each person before the intersection of persons so as to modify the person ID after the intersection of persons.

When the process of assigning the person ID in S2 ends, the attribute recognition circuitry 23 of the CPU 11 of the analysis box 1 subjects a face (image) in the frame image having been subjected to the face detection by the person face detection circuitry 21 to estimation of gender/age using the gender/age estimation model 65 (S5) only if the result of classification of this face (image) is Positive (YES in S3 of FIG. 6), and at the same time if a face assigned with the same person TD as (the person of) this face is yet without being subjected (namely, has not yet been subjected) to the estimation of gender/age (YES in S4). In contrast, the attribute recognition circuitry 23 of the CPU 11 of the analysis box 1 does not subject a face (image) in the frame image having been subjected to the face detection by the person face detection circuitry 21 to estimation of gender/age (S6) if the result of classification of this face (image) is Negative (NO in S3), or if a face assigned with the same person ID as (the person of) this face has already been subjected to the estimation of gender/age (NO in S4). In other words, the attribute recognition circuitry 23 of the CPU 11 of the analysis box 1 subjects the face assigned with the person ID in S2 described above to the estimation of gender/age, only if this face is yet without being subjected (namely, has not yet been subjected) to the estimation of gender/age, and at the same time if this face has been detected by the person face detection circuitry 21 as a suitable face for the estimation of gender/age.

Figure 8:
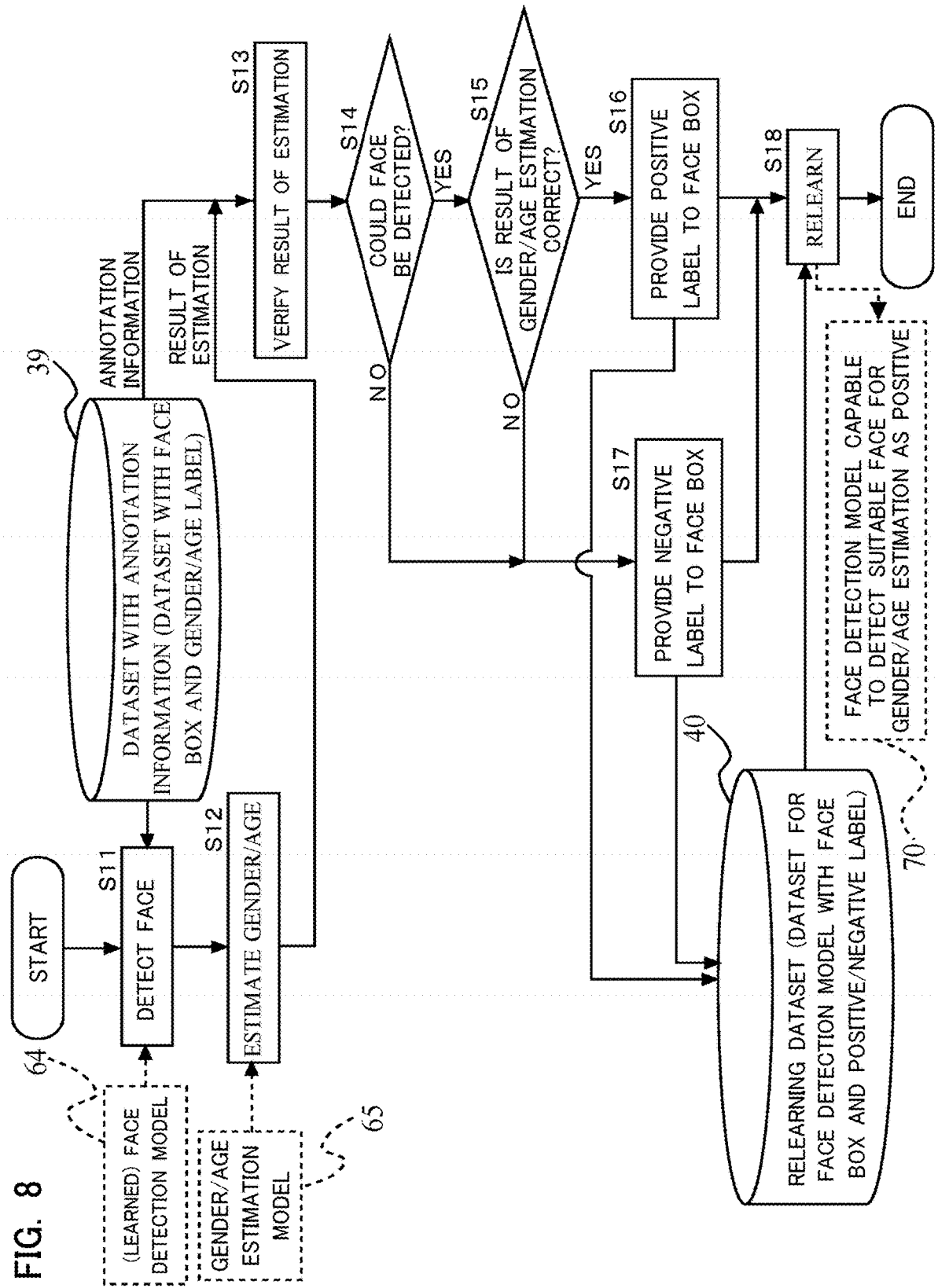
FIG. 8 is a flow chart of a process of creating a relearning dataset and a relearning process in the learning server.

Next, referring to the flow chart of FIG. 8, the following describes in detail the flow of the creation process of the relearning dataset 40 and the relearning process in the process performed by the learning server 6 as described in the description of FIG. 5 after the creation process of the dataset with annotation information 39 ends. The CPU 31 of the learning server 6 subjects each image frame stored in the dataset with annotation information 39 to a face detection process using the (learned) face detection model 64 which is used at the time of normal operation of the analysis box 1 (S11). Then, in contrast to the case of gender/age estimation at the time of normal operation of the analysis box 1 shown in FIG. 6, the CPU 31 of the learning server 6 uses the gender/age estimation model 65 to estimate the gender/age of a face (image) in the frame image having been subjected to the face detection using the face detection model 64, both if the result of classification which has been output together with the face box corresponding to this face (image) is Positive, and if it is Negative (S12).

Next, the (detection result verification circuitry 66 of the) CPU 31 of the learning server 6 starts to compare the result of estimation of the gender/age using the face detection model 64 and the gender/age estimation model 65, which are used at the time of normal operation of the analysis box 1, with content of the gender/age label (annotation information) contained in the dataset with annotation information 39 so as to verify the result of estimation of the gender/age using the face detection model 64 and the gender/age estimation model 65 (S13). In the process of verifying the result of estimation in S13 above, first, the (detection result verification circuitry 66 of the) CPU 31 of the learning server 6 determines (verifies) whether, in the first place, the face detection model 64 could detect the face in S11. More specifically, the detection result verification circuitry 66 of the CPU 31 determines (verifies) whether the face detection model 64 could detect a face (image) in the face box in the frame image (in the dataset with annotation information 39) having been subjected to the face detection using the face detection model 64 in S11 above (S14).

If the detection result verification circuitry 66 determines that the face detection model 64 could detect a face (YES in S14), the detection result verification circuitry 66 determines (verifies) whether the result of estimation of the gender/age (using the gender/age estimation model 65) in S12 above is correct or not (S15). More specifically, the detection result verification circuitry 66 compares the result of estimation of the gender/age (using the gender/age estimation model 65) in S12 above with the gender/age label (annotation information which is the result of estimation of the gender/age using the learned high accuracy gender/age estimation model 63) contained in the dataset with annotation information 39. Based on whether or not there is a difference between these contents (results of estimation of the gender/age), the detection result verification circuitry 66 determines (verifies) whether or not the result of estimation of the gender/age using the gender/age estimation model 65 is correct.

For example, the detection result verification circuitry 66 determines that the result of estimation of the gender/age using the gender/age estimation model 65 is correct, if the gender estimated using the gender/age estimation model 65 is the same as the gender in the annotation information (gender/age label), and at the same time if both the age estimated using the gender/age estimation model 65 and the age in the annotation information (gender/age label) are in the same age group. In contrast, the detection result verification circuitry 66 determines that the result of estimation of the gender/age using the gender/age estimation model 65 is incorrect (wrong), if the gender estimated using the gender/age estimation model 65 is different from the gender in the annotation information, or if the age estimated using the gender/age estimation model 65 and the age in the annotation information (gender/age label) are not in the same age group.

Then, the (relearning dataset editing circuitry 67 of the) CPU 31 edits the correct labels (Positive or Negative) of the relearning dataset 40 of the face detection model 64 based on the results of determination (verification) in S14 and S15 above. More specifically, if it has been determined in the determination of S14 above that the face could be detected using the face detection model 64 (YES in S14), and at the same time if it has been determined in the determination of S15 above that the result of estimation of the gender/age using the gender/age estimation model 65 is correct (YES in S15), the (relearning dataset editing circuitry 67 of the) CPU 31 provides a Positive label to the face box provided to the frame image (contained in the dataset with annotation information 39) having been subjected to the face detection using the face detection model 64 (S16), and stores the (data of the) frame image with the face box and the Positive label in the relearning dataset 40.

Further, if it has been determined in the determination of S14 above that the face could not be detected using the face detection model 64 (NO in S14), or if it has been determined in the determination of S15 above that the result of estimation of the gender/age using the gender/age estimation model 65 is incorrect (wrong) (NO in S15), the (relearning dataset editing circuitry 67 of the) CPU 31 provides a Negative label to the face box provided to the frame image (contained in the dataset with annotation information 39) having been subjected to the face detection using the face detection model 64 (S17), and stores the (data of the) frame image with the face box and the Negative label in the relearning dataset 40.

The (relearning dataset editing circuitry 67 of the) CPU 31 performs such editing process of the relearning dataset 40 as described above so as to create (edit) the relearning dataset 40 which is provided with the face boxes and the Positive/Negative labels and is a dataset for learning (relearning) for the face detection model 64. Then, the relearning circuitry 68 of the CPU 31 of the learning server 6 allows the face detection model 64 to relearn using the relearning dataset 40 described above (S18). Thus, the face detection model 70 (capable to detect a suitable face for the estimation of gender/age as Positive) to be used for the face detection process (S1) at the time of normal operation of the analysis box 1 shown in FIG. 6 above can be obtained.

As described above, the attribute recognition system 10 and the attribute recognition program 55 recorded or stored in the hard disk 12 according to the present embodiment are configured so that only if a face assigned with a person ID is yet without being subjected (namely, has not yet been subjected) to estimation of gender and age, and at the same time if the face assigned with the person ID has been detected by the person face detection circuitry 21 as a suitable face for the estimation of gender/age, this face is subjected to the estimation of gender and age. Thus, only from the face captured in one frame image and suitable for the estimation of gender/age, the gender/age can be accurately estimated. Therefore, in contrast to the conventional system described in Japanese Patent 4778532, the load of the process of recognizing attributes such as gender/age can be reduced.

Further, according to the attribute recognition system 10 of the present embodiment, the learning server 6 uses the learned face detection model 64 to detect a suitable face for the estimation of gender/age, and based on the result of verification of the result of detection, edits the correct labels of the relearning dataset 40 of the face detection model 64. Then, the learning server 6 can allow the learned face detection model 64 to relearn using the edited relearning dataset 40. The relearned face detection model 70 can detect a suitable face for the estimation of gender/age with high accuracy from faces captured in frame images. Therefore, the gender/age can be accurately estimated only from the face in one frame image which has been detected using the relearned face detection model 70 as suitable for the estimation of the gender/age.

Further, the attribute recognition system 10 according to the present embodiment is configured so that the CPU 31 of the learning server 6 automatically verifies the result of detection of a suitable face for the estimation of gender/age as detected using the learned face detection model 64, and based on the result of this verification, automatically provides a correct label of the relearning dataset 40 of the face detection model 64. Thus, the CPU 31 of the learning server 6 can automatically edit (create) the relearning dataset 40 of the face detection model 64.

Further, the attribute recognition system 10 according to the present embodiment is configured so that, based on the result of detection (mainly, the face box provided to the frame image) of a suitable face for the estimation of the gender/age using the face detection model 64 and on the result of estimation of the gender/age using the gender/age estimation model 65, the CPU 31 of the learning server 6 verifies the result of detection of the suitable face for the estimation of the gender/age using the face detection model 64. Thus, the result of detection of the suitable face for the estimation of the gender/age using the face detection model 64 can be more accurately verified than in the case of verifying the result of detection of the suitable face for the estimation of the gender/age using the face detection model 64 based only on either the result of detection of the face using the face detection model 64 or the result of estimation of the gender/age using the gender/age estimation model 65.

Further, according to the attribute recognition system 10 of the present embodiment, the (detection result verification circuitry 66 of the) CPU 31 of the learning server 6 compares the result of estimation of the gender/age using the learned high accuracy gender/age estimation model 63, which can perform a more accurate inference than the gender/age estimation model 65 used at the time of normal operation of the analysis box 1, with the result of estimation of the gender/age using the gender/age estimation model 65 so as to verify the result of detection of the suitable face for the estimation of the gender/age using the face detection model 64. Thus, based on the result of estimation of the gender/age using the gender/age estimation model 65, the CPU 31 of the learning server 6 can automatically verify the result of detection of the suitable face for the estimation of the gender/age using the face detection model 64.

Furthermore, according to the learning sever 6 of the present embodiment, it is possible to edit the correct labels of the relearning dataset 40 of the face detection model 64 based on the result of verification of the result of detection using the learned face detection model 64, which detects a suitable face for the estimation of gender/age from faces captured in frame images, and also to allow the learned face detection model 64 to relearn using the edited relearning dataset 40. This relearning makes it possible for the relearned face detection model 70 to detect a suitable face for the estimation of gender/age with high accuracy from the faces captured in the frame images. Therefore, the gender/age can be accurately estimated only from the face in one frame image which has been detected using the relearned face detection model 70 as suitable for the estimation of the gender/age.

Next, the following notes to prepare for future amendments are added.

(1) As shown in FIG. 5 and FIG. 3, the attribute recognition system 10 according to the present embodiment comprises: the learning attribute recognition circuitry 69 configured to use the learned object recognition neural network (gender/age estimation model 65), which recognizes the attribute of a (person of a) face captured in a frame image, so as to recognize the attribute of the (person of the) face; the relearning circuitry 68 configured to allow the learned object detection neural network (face detection model 64), which detects a suitable face for recognition of the attribute from faces captured in frame images, to relearn so that the face, whose result of recognition of the attribute by the learning attribute recognition circuitry 69 has been correct, is detected using the learned object detection neural network (face detection model 64) as a suitable face for the recognition of the attribute; the person face detection circuitry 21 configured to use the learned object detection neural network having relearned by the relearning circuitry 68 so as to detect a suitable face for the recognition of the attribute from faces captured in frame images input from at least one camera to capture a given capture area; the identification information assignment circuitry 22 configured to identify the faces captured in the frame images having been subjected to the face detection by the person face detection circuitry 21 so as to assign an identification information to each identified face; and the attribute recognition circuitry 23 configured so that only if a face assigned with the identification information is yet without being subjected to (namely, has not yet been subjected to) the recognition of the attribute, and at the same time if the face assigned with the identification information has been detected by the person face detection circuitry 21 as a suitable face for the recognition of the attribute, the attribute recognition circuitry 23 recognizes the attribute of this face by using a learned object recognition neural network similar to the (gender/age estimation model 65 of the) learning attribute recognition circuitry 69.

(2) As shown in FIG. 5, the attribute recognition system 10 further comprises the relearning dataset editing circuitry 67 configured to edit the correct labels of the relearning dataset 40 of the learned object detection neural network (face detection model 64) based on the result of verification whether the result of recognition of the attribute of the face by the learning attribute recognition circuitry 69 is correct or not, in which the relearning circuitry 68 allows the learned object detection neural network (face detection model 64) to relearn using the relearning dataset 40 having been edited by the relearning dataset editing circuitry 67.

(3) As shown in FIG. 5, the attribute recognition system 10 further comprises the detection result verification circuitry 66 configured to verify whether the result of recognition of the attribute of the face by the learning attribute recognition circuitry 69 is correct or not, so as to verify whether the result of detection of the suitable face for the recognition of the attribute using the learned object detection neural network (face detection model 64) similar to the (learned object detection neural network of the) person face detection circuitry 21 (refer to FIG. 3) is correct or not, in which the relearning dataset editing circuitry 67 automatically provides a correct label of the relearning dataset 40 of the learned object detection neural network (face detection model 64) based on the result of verification by the detection result verification circuitry 66.

(4) As shown in FIG. 5, the detection result verification circuitry 66 is configured to compare the result of recognition of the attribute by the learning attribute recognition circuitry 69 with the result of recognition of the attribute using the learned high accuracy object recognition neural network (learned high accuracy neural network for object recognition which is the high accuracy gender/age estimation model 63) which can perform a more accurate inference than the learned object recognition neural network of the learning attribute recognition circuitry 69 and the attribute recognition circuitry 23, so as to verify the result of detection of the suitable face for the recognition of the attribute using the learned object detection neural network (face detection model 64) similar to the person face detection circuitry 21.

(5) As shown in FIG. 5, the detection result verification circuitry 66 is configured so that based on the result of detection of the suitable face for the recognition of the attribute using the learned object detection neural network (face detection model 64) similar to the (learned object detection neural network of the) person face detection circuitry 21 (refer to FIG. 3), and on the result of recognition of the attribute by the learning attribute recognition circuitry 69, the detection result verification circuitry 66 verifies the result of detection of the suitable face for the recognition of the attribute using the learned object detection neural network (face detection model 64) similar to the person face detection circuitry 21.

(6) As shown in FIG. 5, the learning server 6 comprises: the learning attribute recognition circuitry 69 configured to use the learned object recognition neural network (gender/age estimation model 65), which recognizes the attribute of a face captured in a frame image, so as to recognize the attribute of the face; the relearning dataset editing circuitry 67 configured so that based on the result of verification whether the result of recognition of the attribute of the face by the learning attribute recognition circuitry 69 is correct or not, the relearning dataset editing circuitry 67 edits the correct labels of the relearning dataset 40 of the learned object detection neural network (face detection model 64), which detects a suitable face for the recognition of the attribute from faces captured in frame images; and the relearning circuitry 68 configured to allow the learned object detection neural network (face detection model 64) to relearn using the relearning dataset 40 edited by the relearning dataset editing circuitry 67 so that the face, whose result of recognition of the attribute by the learning attribute recognition circuitry 69 has been correct, is detected using the learned object detection neural network (face detection model 64) as a suitable face for the recognition of the attribute.

Figure 6:
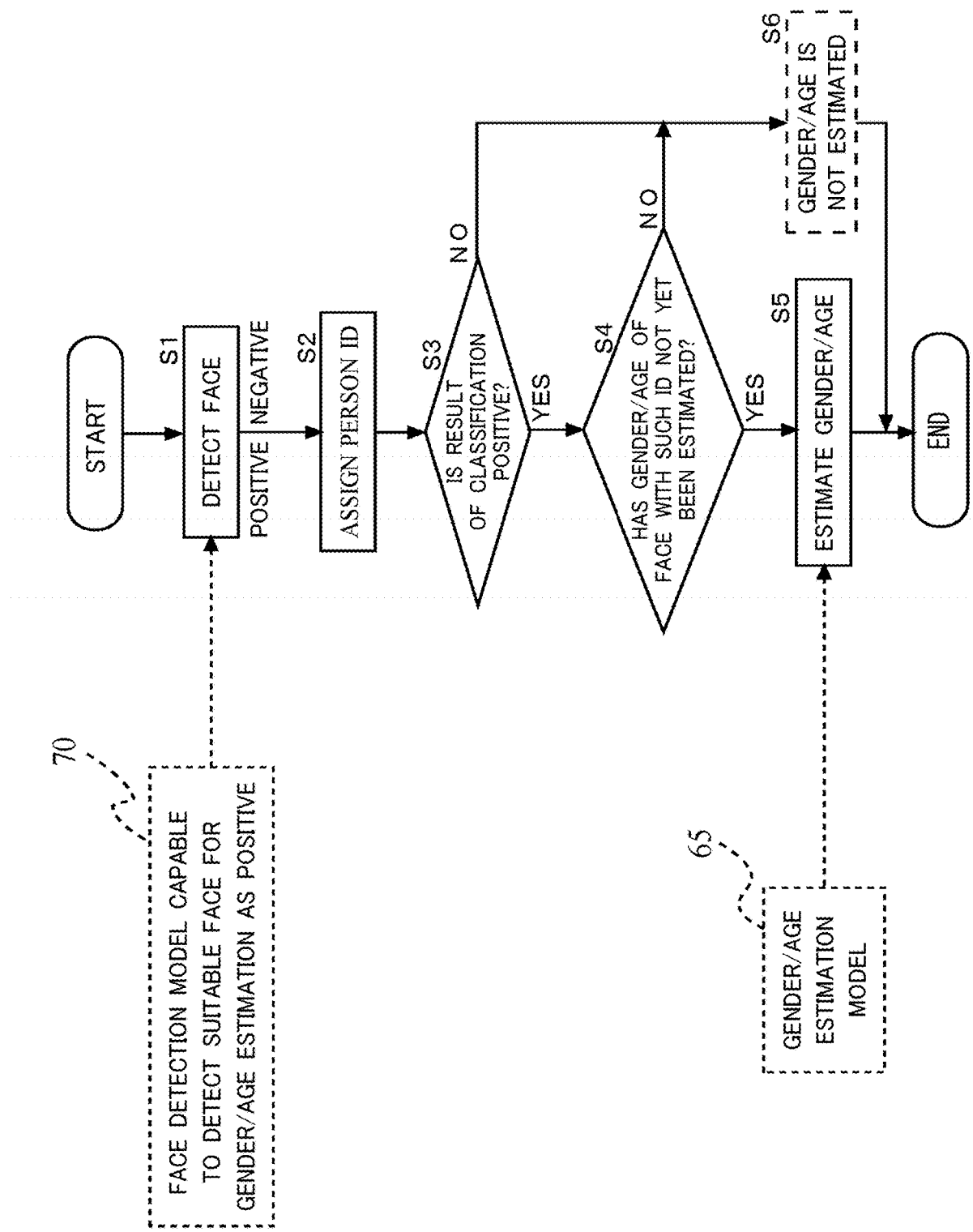
FIG. 6 is a flow chart of a face detection process and a gender/age estimation process at the time of normal operation of the analysis box.

(7) The attribute recognition program 55 recorded in a non-transitory computer-readable recording medium (hard disk 12) causes a computer to execute a process, as shown in FIG. 6, including the steps of detecting a suitable face for recognition of at least one attribute, using a learned object detection neural network, from faces captured in frame images input from at least one camera to capture a given capture area (S1); identifying the faces captured in the frame images having been subjected to the face detection so as to assign an identification information (person ID) to each identified face (S2); and recognizing the attribute (estimating the gender/age) of a face assigned with the identification information using the gender/age estimation model 65 (S5) only if this face is yet without being subjected (namely, has not yet been subjected) to the recognition of the attribute, and at the same time if this face has been detected in a person face detection step as a suitable face for the recognition of the attribute (YES in S3 and S4). As shown in FTG. 6, the learned object detection neural network (face detection model 70) is a learned object detection neural network having relearned so that the face, whose result of recognition of the attribute using the learned object recognition neural network (gender/age estimation model 65) similar to the learned object recognition neural network of the attribute recognition circuitry 23 has been correct, is detected using the learned object detection neural network as a suitable face (Positive) for the recognition of the attribute.

MODIFIED EXAMPLES

It is to be noted that the present invention is not limited to the above-described exemplary embodiment, and various modifications are possible within the spirit and scope of the present invention. Modified examples of the present invention will be described below.

Modified Example 1

In the exemplary embodiment described above, the CPU 31 of the learning server 6 compares the result of estimation of the gender/age using the learned high accuracy gender/age estimation model 63, which can perform an inference with high accuracy, with the result of estimation of the gender/age using the gender/age estimation model 65 used at the time of normal operation of the analysis box 1 so as to verify the result of estimation of the gender/age using the gender/age estimation model 65, thereby verifying the result of detection using the face detection model 64, and based on the result of this verification, automatically provides a correct label (Positive or Negative) of the relearning dataset 40 of the face detection model 64. However, it is not limited to this. For example, as shown in FIG. 9, the CPU 31 of the learning server 6 can be configured to comprise a learned high accuracy face detection model 72 (corresponding to the "learned high accuracy object detection neural network" in the claims) which can perform a more accurate inference than the face detection model 64 used at normal operation of the analysis box 1, and to automatically assign correct labels to the (images in the) relearning dataset 40 based on the result of detection using this high accuracy face detection model 72.

Figure 9:
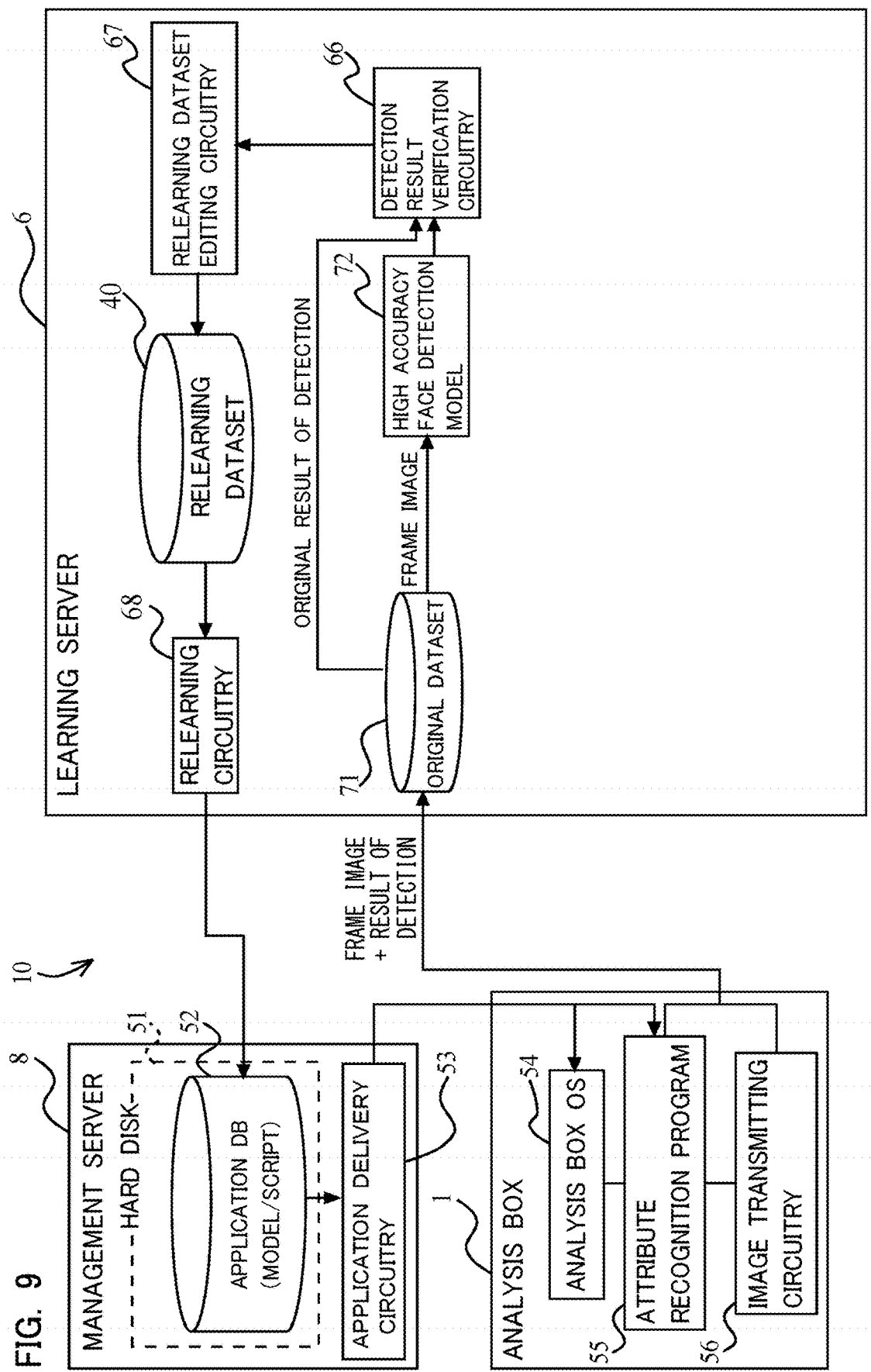
FIG. 9 is a schematic block diagram showing an outline of functions performed by main units and a flow of main data in an attribute recognition system of Modified Example 1 of the present invention.

In this Modified Example 1, for example, as shown in FIG. 9, the CPU 31 of the learning server 6 receives, from an image transmitting circuitry 56 of the analysis box 1 via the communication unit 36 (refer to FIG. 4), both the result of detection of the face using the face detection model 64 used at normal operation of the analysis box 1 and frame images (data) having been subjected to this face detection process, and creates an original dataset 71 composed of the frame images with face boxes based on the received data. Then, the CPU 31 of the learning server 6 detects each frame image stored in the original dataset 71 using the high accuracy face detection model 72 described above, and allows the detection result verification circuitry 66 to verify, considering that the result of highly accurate face detection (face box, and result of classification of Positive/Negative) using the high accuracy face detection model 72 is a correct result of face detection. Further, based on the result of this verification (more accurately, result of face detection using the high accuracy face detection model 72), the relearning dataset editing circuitry 67 automatically provides a correct label of the relearning dataset 40 of the face detection model 64, or in other words, creates the relearning dataset 40 by providing the result of the face detection (face box and Positive/Negative label) using the high accuracy face detection model 72 to each frame image having been subjected to the face detection process using the high accuracy face detection model 72.

Note that it can also be configured so that the original dataset 71 is composed of frame images with face boxes and Positive/Negative labels received from the analysis box 1 instead of being composed of the frame images with the face boxes received from the analysis box 1 as described above, and that if the result of face detection (face box, and the result of classification of Positive/Negative) using the high accuracy face detection model 72 is different from the result of face detection (of the face detection model 64) received from the analysis box 1, the data of the result of face detection in the original dataset 71 (face box and Positive/

Negative label) as modified by the result of face detection using the high accuracy face detection model 72 is stored in the relearning dataset 40.

Modified Example 2

In the exemplary embodiment described above, the detection result verification circuitry 66 of the CPU 31 of the learning server 6 compares the result of estimation of the gender/age using the gender/age estimation model 65 with the gender/age label (annotation information which is the result of estimation of the gender/age using the learned high accuracy gender/age estimation model 63) contained in the dataset with annotation information 39. Based on whether or not there is a difference between these contents (results of estimation of the gender/age), the detection result verification circuitry 66 determines (verifies) whether or not the result of estimation of the gender/age using the gender/age estimation model 65 is correct, so as to verify the result of detection of the suitable face for the estimation of the gender/age using the face detection model 64. Based on the result of this verification, the relearning dataset editing circuitry 67 of the CPU 31 automatically edits (provides) the correct labels (Positive or Negative) of the relearning dataset 40 of the face detection model 64. However, it is not limited to this. It can also be configured so that a human such as a system manager or the like determines whether or not the result of estimation of the gender/age using the gender/age estimation model is correct (that is, the human verifies the result of detection of the suitable face for the estimation of the gender/age using the face detection model), and based on the result of this determination (verification), the human such as a system manger or the like edits (manually inputs) the correct labels of the relearning dataset of the face detection model.

Modified Example 3

The exemplary embodiment described above has shown an example, in which the attribute recognition circuitry 23 of the CPU 11 of the analysis box 1 estimates the gender and age on a (person of a) face detected by the person face detection circuitry 21. However, it is not limited thereto. For example, it can be configured so that, from a person area detected by a person detection circuitry, the attribute recognition circuitry of the CPU of the analysis box recognizes attributes such as clothing, belongings and the like which are useful to identify an individual. This makes it possible to apply the attribute recognition system of the present invention to an attribute recognition system for detecting (recognizing) a person, for example, with a shopping basket, and to an attribute recognition system for classifying clerks and customers.

Modified Example 4

In the exemplary embodiment described above, the CPU 11 of the analysis box 1 is configured to comprise the person face detection circuitry 21, the identification information assignment circuitry 22 and the attribute recognition circuitry 23. However, it is not limited thereto. For example, it can be configured so that an AI (Artificial Intelligence) camera with so-called edge computing capability is used for each camera placed in each store, and an application package comprising a learned face detection model, a learned gender/age estimation model, a learned vectorization model and a control script describing a process order of these NN models is installed in the AI camera so as to allow the AI camera to have the functions of the person face detection circuitry, the identification information assignment circuitry and the attribute recognition circuitry. It is also possible to install the application package in another computer other than the analysis box in the attribute recognition system so as to allow such another computer to have the functions of the person face detection circuitry, the identification information assignment circuitry and the attribute recognition circuitry.

Modified Example 5

The exemplary embodiment described above has shown an example, in which the attribute recognition system 10 comprises the learning server 6, the AI analysis server 7 and the management server 8 on cloud C. However, the configuration of the attribute recognition system is not limited to this, and it can, for example, comprise only the learning server and the management server or comprise only the learning server on cloud C.

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:
1. An attribute recognition method, comprising:
   detecting a suitable person or face for a recognition of at least one attribute from persons or faces, the persons or faces being captured in frame images by using a learned object detection neural network;
   recognizing, by a first learned object recognition neural network, at least one attribute of the suitable person or face detected by the learned object detection neural network;
   relearning a learned object detection neural network so that the suitable person or face, whose result of the recognition of the at least one attribute by the first learned object recognition neural network has been correct, is detected by the learned object detection neural network as the suitable person or face for the recognition of the at least one attribute;
   detecting the suitable person or face for the recognition of at least one attribute from the persons or faces captured in frame images input from at least one camera to capture a given capture area by using the learned object detection neural network relearned in the relearning;
   identify identifying the persons or faces detected by the learned object detection neural network relearned in the relearning to assign an identification information to each identified person or face;
   recognizing, by using a second edge side learned object recognition neural network similar to the first learned object recognition neural network, the at least one attribute of a the person or face assigned with the identification information, only if when the person or face assigned with the identification information has been detected by-the-person-face-detection-circuitry as a the suitable person or face for the recognition of the at least one attribute by the learned object detection neural network relearned in the relearning,
   further comprising editing correct labels of a relearning dataset of the learned object detection neural network based on a result of verification whether the result of the recognition of the at least one attribute by the first learned object recognition neural network is correct, wherein the learned object detection neural network is relearned using the relearning dataset having been edited by the editing.

2. The attribute recognition method according to claim 1, further comprising verifying whether the result of the recognition of the at least one attribute of the person or face by the first learned object recognition neural network is correct, to automatically verify whether the result of the detection of the suitable person or face for the recognition of the at least one attribute using the learned object detection neural network is correct, wherein the correct labels of the relearning dataset of the learned object detection neural network is automatically assigned based on the result of the automatic verification.

3. The attribute recognition method according to claim 2, wherein the result of the detection of the suitable person or face for the recognition of the at least one attribute using the learned object detection neural network is verified by comparing the result of the recognition of the at least one attribute by the first learned object recognition neural network with a result of recognition of the at least one attribute of the person or face using a third learned high accuracy object recognition neural network which can perform a more accurate inference than the first learned object recognition neural network and the second edge side learned object recognition neural network.

4. The attribute recognition method according to claim 2, wherein the result of the detection of the suitable person or face for the recognition of the at least one attribute using the learned object detection neural network is verified, based on the result of the detection of the suitable person or face for the recognition of the at least one attribute by the learned object detection neural network, and the result of recognition of the at least one attribute by the first learned object recognition neural network.

5. The attribute recognition method according to claim 1, wherein the at least one attribute includes gender and age.

6. A non-transitory computer-readable recording medium for recording a program for causing a computer to execute processing, the processing comprising:

detecting a suitable person or face for a recognition of at least one attribute from persons or faces captured in frame images by using a learned object detection neural network;

recognizing, by a first learned object recognition neural network, the at least one attribute of the suitable person or face detected by the learned object detection neural network; and relearning a learned object detection neural network so that the suitable person or face, whose result of the recognition of the at least one attribute by the first learned object recognition neural network has been correct, is detected by the learned object detection neural network as the suitable person or face for the recognition of the at least one attribute; wherein the processing further comprises editing correct labels of a relearning dataset of the learned object detection neural network based on a result of verification whether the result of the recognition of the at least one attribute by the first learned object recognition neural network is correct, and the learned object detection neural network is relearned using the relearning dataset having been edited by the editing.

7. The non-transitory computer-readable recording medium according to claim 6, wherein the at least one attribute includes gender and age.

8. The non-transitory computer-readable recording medium according to claim 6, wherein the processing further comprises verifying whether the result of the recognition of the at least one attribute of the person or face by the first learned object recognition neural network is correct, to automatically verify whether the result of the detection of the suitable person or face for the recognition of the at least one attribute using the learned object detection neural network is correct, and the correct labels of the relearning dataset of the learned object detection neural network is automatically assigned based on the result of the automatic verification.

9. The non-transitory computer-readable recording medium according to claim 8, wherein the result of the detection of the suitable person or face for the recognition of the at least one attribute using the learned object detection neural network is verified by comparing the result of the recognition of the at least one attribute by the first learned object recognition neural network with a result of recognition of the at least one attribute of the person or face using a third learned high accuracy object recognition neural network which can perform a more accurate inference than the first learned object recognition neural network and a second edge side learned object recognition neural network.

10. The non-transitory computer-readable recording medium according to claim 8, wherein the result of the detection of the suitable person or face for the recognition of the at least one attribute using the learned object detection neural network is verified, based on the result of the detection of the suitable person or face for the recognition of the at least one attribute by the learned object detection neural network, and the result of recognition of the at least one attribute by the first learned object recognition neural network.

11. An attribute recognition system, comprising:

an edge side analysis computer connected to at least one camera to capture a given capture area; and a learning server, wherein the learning server comprises a storage for storing a first program to cause the learning server to execute processing comprising:

detecting a suitable person or face for a recognition of at least one attribute from persons or faces, the persons or faces being captured in frame images by using a learned object detection neural network;

recognizing, by a first learned object recognition neural network, at least one attribute of the suitable person or face detected by the learned object detection neural network; and relearning a learned object detection neural network so that the suitable person or face, whose result of the recognition of the at least one attribute by the first learned object recognition neural network has been correct, is detected by the learned object detection neural network as the suitable person or face for the recognition of the at least one attribute, and the edge side analysis computer comprises a storage for storing a second program to cause the edge side analysis computer to execute processing comprising:

detecting the suitable person or face for the recognition of at least one attribute from the persons or faces captured in frame images input from the at least one camera to capture a given capture area by using the learned object detection neural network relearned in the relearning;

identifying the persons or faces detected by the learned object detection neural network relearned in the relearning to assign an identification information to each identified person or face; and recognizing, by using a second edge side learned object recognition neural network similar to the first learned object recognition neural network, the at least one attribute of the person or face assigned with the identification information, only if the person or face assigned with the identification information has been detected as the suitable person or face for the recognition of the at least one attribute by the learned object detection neural network relearned in the relearning, wherein the processing of the first program further comprises editing correct labels of a relearning dataset of the learned object detection neural network based on a result of verification whether the result of the recognition of the at least one attribute by the first learned object recognition neural network is correct, and at least one attribute from the persons or faces captured in frame images input from the at least one camera to capture a given capture area by using the learned object detection neural network relearned in the relearning;

identifying the persons or faces detected by the learned object detection neural network relearned in the relearning to assign an identification information to each identified person or face; and recognizing, by using a second edge side learned object recognition neural network similar to the first learned object recognition neural network, the at least one attribute of the person or face assigned with the identification information, only if the person or face assigned with the identification information has been detected as the suitable person or face for the recognition of the at least one attribute by the learned object detection neural network relearned in the relearning;

the learned object detection neural network is relearned using the relearning dataset having been edited by the editing.

12. The attribute recognition system according to claim 11, wherein the processing of the first program further comprises verifying whether the result of the recognition of the at least one attribute of the person or face by the first learned object recognition neural network is correct, to automatically verify whether the result of the detection of the suitable person or face for the recognition of the at least one attribute using the learned object detection neural network is correct, and the correct labels of the relearning dataset of the learned object detection neural network is automatically assigned based on the result of the automatic verification.

13. The attribute recognition system according to claim 12, wherein the result of the detection of the suitable person or face for the recognition of the at least one attribute using the learned object detection neural network is verified by comparing the result of the recognition of the at least one attribute by the first learned object recognition neural network with a result of recognition of the at least one attribute of the person or face using a third learned high accuracy object recognition neural network which can perform a more accurate inference than the first learned object recognition neural network and the second edge side learned object recognition neural network.

14. The attribute recognition system according to claim 12, wherein the result of the detection of the suitable person or face for the recognition of the at least one attribute using the learned object detection neural network is verified, based on the result of the detection of the suitable person or face for the recognition of the at least one attribute by the learned object detection neural network, and the result of recognition of the at least one attribute by the first learned object recognition neural network.

15. The attribute recognition system according to claim 11, wherein the at least one attribute includes gender and age.

\* \* \* \* \*